United States Patent
Lamprey, Jr. et al.

(10) Patent No.: US 8,721,386 B2
(45) Date of Patent: May 13, 2014

(54) NOISE-MAKING DEVICE

(76) Inventors: Charles W. Lamprey, Jr., San Jose, CA (US); Amanda E. Hutton, Lantana, FL (US)

( * ) Notice: Subject to any disclaimer, the term of this patent is extended or adjusted under 35 U.S.C. 154(b) by 203 days.

(21) Appl. No.: 13/312,896

(22) Filed: Dec. 6, 2011

(65) Prior Publication Data

US 2012/0137957 A1  Jun. 7, 2012

Related U.S. Application Data

(60) Provisional application No. 61/419,978, filed on Dec. 6, 2010, provisional application No. 61/439,038, filed on Feb. 3, 2011.

(51) Int. Cl.
*A63H 5/00* (2006.01)
*A63H 5/04* (2006.01)

(52) U.S. Cl.
USPC .......................................... 446/213; 446/215

(58) Field of Classification Search
USPC .......... 446/213–216; 119/707, 708, 709, 795, 119/796
See application file for complete search history.

(56) References Cited

U.S. PATENT DOCUMENTS

| 291,548 | A | 1/1884 | Swan |
| 312,322 | A | 2/1885 | Bray |
| 482,786 | A | 9/1892 | Crocker |
| 620,087 | A | 2/1899 | Stein |
| 754,148 | A | 3/1904 | Kuhlemann |
| 795,493 | A | 7/1905 | Ditto |
| 827,819 | A | 8/1906 | Reynolds |
| 870,074 | A | 11/1907 | Astrom |
| 1,043,123 | A | 11/1912 | McCluskey |
| 1,113,400 | A | 10/1914 | Baumgartner |
| 1,187,838 | A | 6/1916 | Hughes |
| 1,229,757 | A | 6/1917 | Knapp |
| 1,568,275 | A | 1/1926 | Grubman |
| 1,649,722 | A | 11/1927 | Munro |
| 2,331,630 | A | 10/1943 | Rempel |
| 2,346,634 | A | 4/1944 | Kempthorn |
| 2,405,149 | A | 8/1946 | Kempthorn |
| 2,461,588 | A * | 2/1949 | Cooper .......................... 116/99 |
| 2,468,760 | A | 5/1949 | Kempthorn |
| 2,537,089 | A | 1/1951 | Rempel |
| 2,598,956 | A | 6/1952 | Wintriss |
| 2,604,731 | A | 7/1952 | Meucci |

(Continued)

FOREIGN PATENT DOCUMENTS

GB  2027351 A  2/1980

OTHER PUBLICATIONS

Int'l Bureau of WIPO, International Preliminary Report on Patentability; (Jun. 2013), Geneva, Switzerland, 8 pp.

*Primary Examiner* — Kien Nguyen
(74) *Attorney, Agent, or Firm* — Kali Law Group, P.C.

(57) ABSTRACT

Noise-making devices are presented including: a compressible noise-making assembly, the compressible noise-making assembly configured for emitting a noise upon compressive deformation; a compression assembly for compressing and retaining the compressible noise-making assembly, the compression assembly including, at least two opposing surfaces defining a cavity for receiving the compressible noise-making assembly, the opposing surfaces each in mechanical communication with the compressible noise-making assembly, and at least two pulls each attached to one of the opposing surfaces such that when the two pulls are divergently pulled a compressive force is exerted upon the compressible noise-making device by the opposing surfaces.

16 Claims, 13 Drawing Sheets

(56) References Cited

U.S. PATENT DOCUMENTS

| | | |
|---|---|---|
| 2,712,201 A | 7/1955 | Wintriss |
| 2,714,275 A | 8/1955 | Proll |
| 2,730,765 A | 1/1956 | Crafton et al. |
| 2,739,065 A | 3/1956 | Hugin |
| 2,745,214 A | 5/1956 | Lawson |
| 2,817,116 A | 12/1957 | Miller et al. |
| 2,819,558 A | 1/1958 | Freimauer |
| 2,825,180 A | 3/1958 | Dieckmann |
| 2,928,208 A | 3/1960 | Wintriss |
| 2,075,317 A | 1/1963 | Craft |
| 3,702,038 A | 11/1972 | Hakim |
| 3,705,466 A | 12/1972 | Sela |
| 4,277,232 A | 7/1981 | Taluba et al. |
| 4,277,300 A | 7/1981 | Taluba et al. |
| 4,380,134 A | 4/1983 | Taluba et al. |
| 4,655,840 A | 4/1987 | Wittwer et al. |
| 6,112,703 A | 9/2000 | Handelsman |
| 6,881,121 B1 | 4/2005 | Szekely |
| 7,097,533 B2 | 8/2006 | Szekely |
| 7,201,117 B2 | 4/2007 | Ritchey et al. |
| 2006/0009319 A1 | 1/2006 | Nelson et al. |
| 2007/0234969 A1 | 10/2007 | Lynch |
| 2007/0283900 A1 | 12/2007 | Jager |

\* cited by examiner

NOISE-MAKING DEVICE

PRIORITY CLAIM TO PROVISIONAL APPLICATIONS

A claim for priority is hereby made under the provisions of 35 U.S.C. §119 for the present application based upon U.S. Provisional Patent Application No. 61/419,978 filed on Dec. 6, 2010 and upon U.S. Provisional Patent Application No. 61/439,038 filed on Feb. 3, 2011 which are incorporated herein by reference.

BACKGROUND

Currently available compression operated pneumatic toy squeakers produce a noise when they are directly compressed between two opposing forces, such as when squeezed between fingers or between an animal's teeth or paws. For example, FIG. 1 is a prior art illustrative representation of a commercially available "round pillow shaped" compression operated pneumatic noise-maker or squeaker 100 commonly found within both animal and human toys and training tools. As illustrated, squeaker 100 may be compressed by applying a direct compressive force 104a and 104b by fingers 110a and 110b. When squeaker 100 is compressed, air is forced through noise-making element 102 resulting in a "squeak."

When squeakers are utilized conventionally in toys or training tools, direct compression of the squeaker exposes the squeaker to wear and tear. For example, in an animal toy, a squeaker may be severely abraded or breached as a direct result of contact with an animal's teeth or paws, which may limit the useful life of the toy or training tool. As may be appreciated, a breach may provide a lower resistance air outlet that renders the noise-making element ineffective.

Additionally, conventional squeaker arrangements may limit the possible shapes and configurations of toys or training tools. For example, a multi-armed toy or training tool may not be practical when utilizing conventional squeaker arrangements requiring direct compression. In another example, pulling arrangements resulting in a noise may not be possible where only direct compression is utilized.

As such, noise-making devices and methods of use are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Noise-making devices are presented including: a compressible noise-making assembly, the compressible noise-making assembly configured for emitting a noise upon compressive deformation; a compression assembly for compressing and retaining the compressible noise-making assembly, the compression assembly including, at least two opposing surfaces defining a cavity for receiving the compressible noise-making assembly, the opposing surfaces each in mechanical communication with the compressible noise-making assembly, and at least two pulls each attached to one of the opposing surfaces such that when the two pulls are divergently pulled a compressive force is exerted upon the compressible noise-making device by the opposing surfaces.

In some embodiments, each of the opposing surfaces form an annular surface, where the opposing surfaces are disposed approximately 90° apart with respect to one another along the compressible noise-making assembly, and where the opposing surfaces are at least partially bonded with a surface of the compressible noise-making assembly.

In other embodiments, noise-making devices are presented including: at least one compressible noise-making assembly having a through-hole, the compressible noise-making assembly configured for emitting a noise upon compressive deformation; at least one compression assembly for compressing the noise-making assembly, the compression assembly including, a first compression surface in mechanical communication with the compressible noise-making assembly and disposed along an outward surface of the compressible noise-making assembly, where the first compression surface includes a surface hole aligned with the through-hole of the compressible noise-making assembly, a pull extending through the through-hole and the surface hole, where the pull includes a compression stop, where the compression stop is disposed along an inward surface of the at least one compressible noise-making assembly.

In other embodiments, noise-making devices are presented including: at least one expandable noise-making assembly configured for emitting a noise upon expanding deformation; at least two pull tabs juxtaposed across a surface of the expandable noise-making assembly; and at least two pulls each attached with each of the pull tabs extending there from.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

It may be appreciated that embodiments described herein may include many variations and configurations without departing from the present invention. However, at least three common elements may be found across all embodiments, that is:

One or more compressible noise-making assemblies;
One or more pulls; and
An indirect motive force.

Indirect motive force, for purposes of this disclosure, means that compressible noise-making assemblies are not directly compressed by a human or animal as discussed above. That is, for example, a dog will not bite a squeaker or covered squeaker to emit a sound in embodiments disclosed utilizing indirect motive force. Rather, an indirect motive force, such as a pulling force, may be applied to a pull, which in turn results in a compressive or expansive deformation of a compressible noise-making assemblies resulting in a noise emission.

Compressive Deformation

Figure 1:
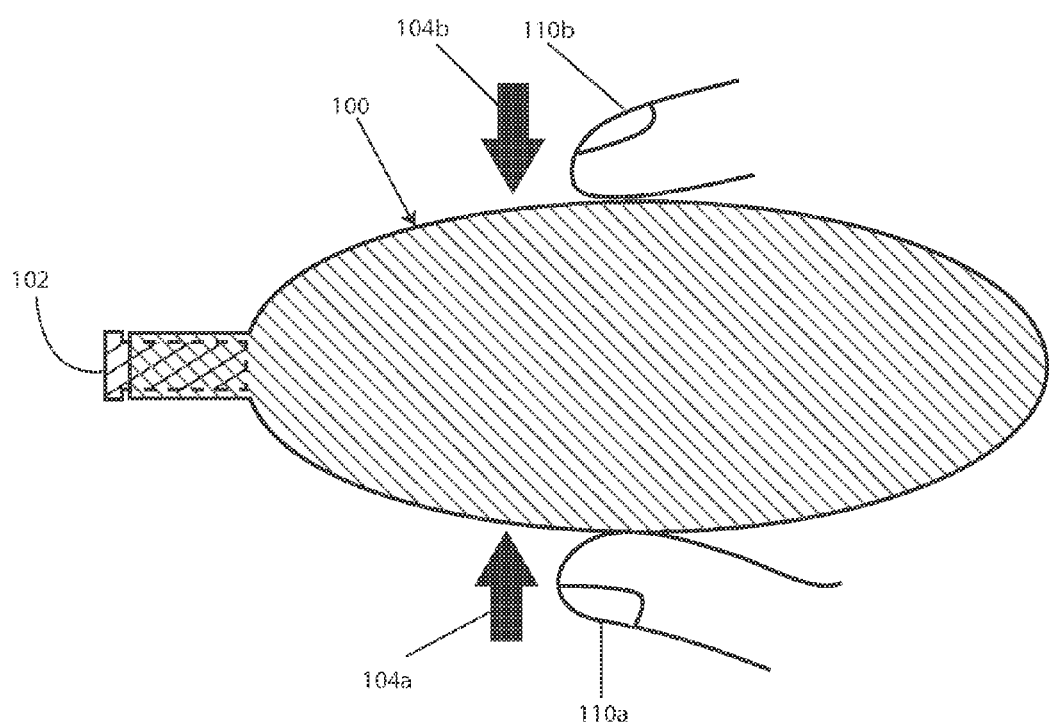
FIG. 1 is a prior art illustrative representation of a commercially available "round pillow shaped" compression operated pneumatic noise-maker or squeaker.
Figure 2:
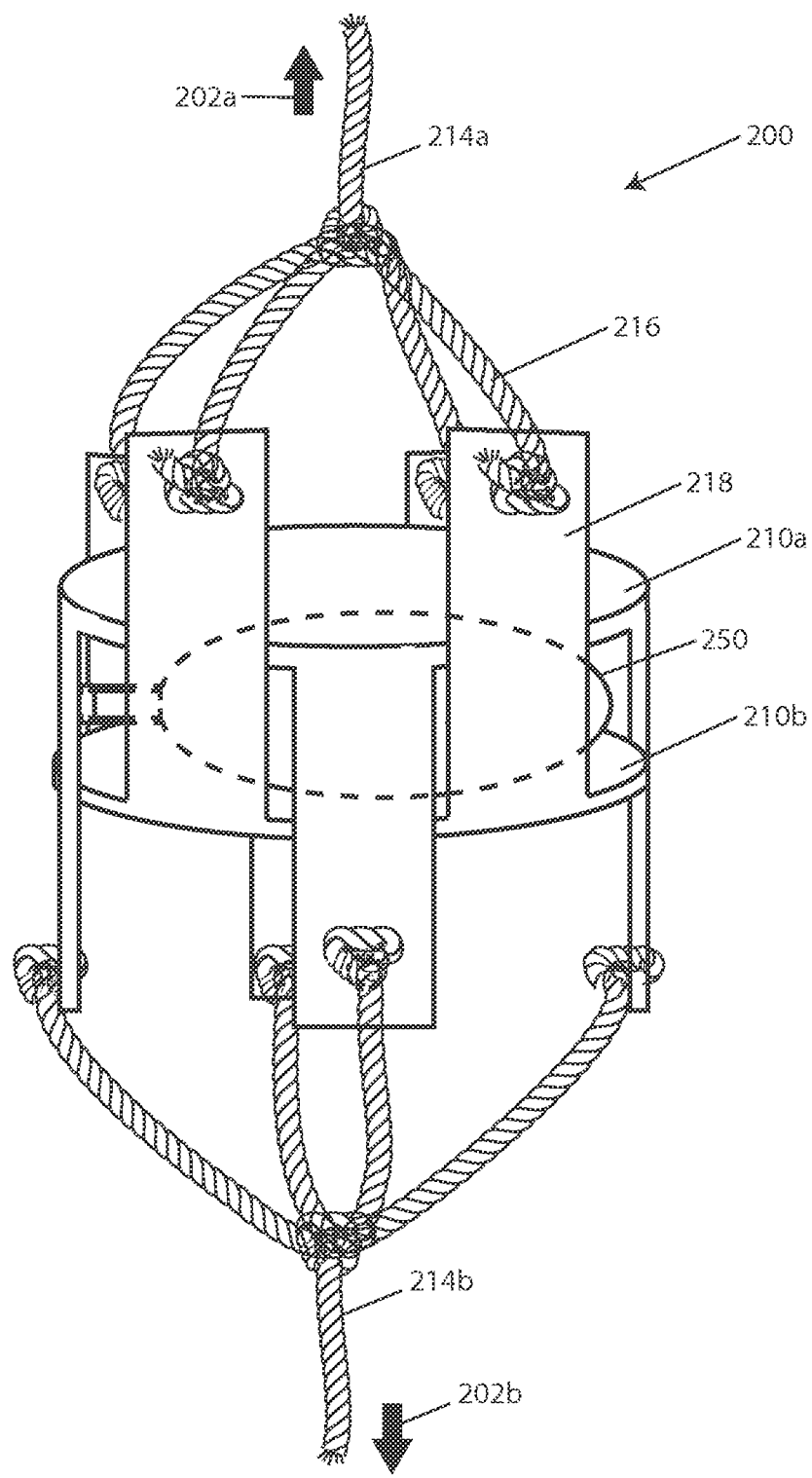
FIG. 2 is an illustrative representation of a noise-making device in accordance with embodiments of the present invention.

The following figures and embodiments may be categorized as noise-making devices that operate generally by compressive deformation. That is, in operation, a compressible noise-making assembly will emit a noise when the assembly is compressed. In some embodiments, a noise is emitted when air is expelled from the assembly. In other embodiments, noise is also emitted when air refills the assembly once compressive forces are released. FIG. 2 is an illustrative representation of a noise-making device 200 in accordance with embodiments of the present invention. In particular, noise making device 200 illustrates an embodiment utilizing indirect motive forces 202a and 202b to apply a compressive force to compressible noise-making assembly 250. As illustrated, compression assembly embodiments include two or more opposing surfaces 210a and 210b, which define a cavity for receiving compressible noise-making assembly 250 such that the opposing surfaces are in mechanical communication with compressible noise-making assembly 250. It may be appreciated that opposing surfaces may include planar surfaces and non-planar surfaces without departing from embodiments of the present invention. In some embodiments, opposing surfaces may include a non-abrasive pad for further reducing abrasion to compressible noise-making assemblies. In other embodiments, opposing surfaces may include a textured pad for increasing friction to compressible noise-making assemblies. In still other embodiments, opposing surfaces may include an adhesive pad for securing compressible noise-making assemblies. In addition, opposing surfaces may be manufactured from any number of materials including: semi-flexible polymeric formulations, rigid polymeric formulations, polymeric films, polymeric cloths, and natural fiber cloths without departing from embodiments herein.

In some embodiments, opposing surfaces 210a and 210b may further include an open portion (not shown). An open portion disposed along an opposing surface may be useful for centering or otherwise aligning compressible noise-making assemblies. Open portions may be configured in any number of shapes or sizes without limitation in embodiments. In other embodiments, opposing surfaces may include a domed portion. A domed portion disposed along an opposing surface may be useful for centering or otherwise aligning compressible noise-making assemblies. Domed portions may be configured in any number of shapes or sizes without limitation in embodiments.

As illustrated, opposing surfaces may include two or more pull tabs 218. In embodiments, pull tabs may extend approximately perpendicular from opposing surfaces 210a and 210b to form a cage by which compressible noise-making assembly 250 may be retained. Pull tabs, in some embodiments, may be disposed along an outer edge of opposing surfaces or along another portion of opposing surfaces. Further illustrated are pulls 214a and 214b. Pulls, as contemplated herein, may be divergently pulled (indirect motive force) such that a compressive force is exerted on compressible noise-making assemblies. Pulls may further include two or more pull extensions 216 attached with pulls 214a to distribute pulling force to all pull tabs 218. As illustrated, pull extension 216 extends from pull 214a end and attaches with pull tab 218. It may be appreciated that, in embodiments, pulls may include: ropes, straps, strings, yarns, cords, and cables manufactured from polymeric formulations, natural fibers, and metal formulations. Furthermore, pulls may be attached with opposing surfaces in any manner well-known in the art without departing from embodiments disclosed herein. It may be further appreciated that the positioning, assemblage, and type of the components in this figure and all other figures and discussions herein are for illustration only and that numerous alternative methods of construction and assembly will be readily apparent to those skilled in the arts.

Figure 3:
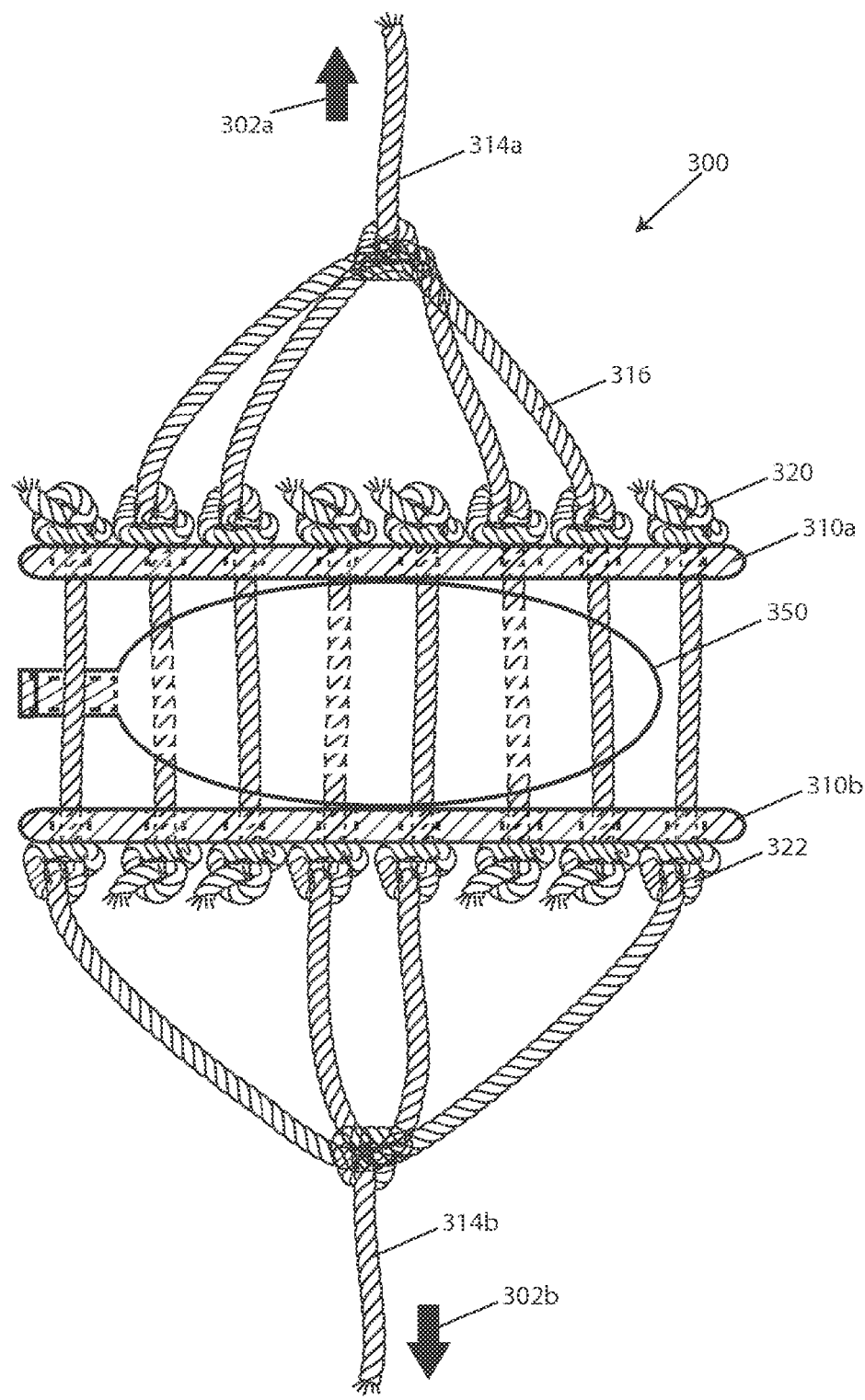
FIG. 3 is an illustrative representation of an alternative noise-making device in accordance with embodiments of the present invention.

FIG. 3 is an illustrative representation of another noise-making device 300 in accordance with embodiments of the present invention. In particular, noise making device 300 illustrates an embodiment utilizing indirect motive forces 302a and 302b to apply a compressive force to compressible noise-making assembly 350. As illustrated, compression assembly embodiments include two or more opposing surfaces 310a and 310b, which define a cavity for receiving compressible noise-making assembly 350 such that the opposing surfaces are in mechanical communication with compressible noise-making assembly 350. It may be appreciated that opposing surfaces may include planar surfaces and non-planar surfaces without departing from embodiments of the present invention. In some embodiments, opposing surfaces may include a non-abrasive pad for further reducing abrasion to compressible noise-making assemblies. In other embodiments, opposing surfaces may include a textured pad for increasing friction to compressible noise-making assemblies. In still other embodiments, opposing surfaces may include an adhesive pad for securing compressible noise-making assemblies. In addition, opposing surfaces may be manufactured from any number of materials including: semi-flexible polymeric formulations, rigid polymeric formulations, polymeric films, polymeric cloths, and natural fiber cloths without departing from embodiments herein.

In some embodiments, opposing surfaces 310a and 310b may further include an open portion (not shown). An open portion disposed along an opposing surface may be useful for centering or otherwise aligning compressible noise-making assemblies. Open portions may be configured in any number of shapes or sizes without limitation in embodiments. In other embodiments, opposing surfaces may include a domed portion. A domed portion disposed along an opposing surface may be useful for centering or otherwise aligning compressible noise-making assemblies. Domed portions may be configured in any number of shapes or sizes without limitation in embodiments.

Further illustrated are pulls 314a and 314b. Pulls, as contemplated herein, may be divergently pulled (indirect motive force) such that a compressive force is exerted on compressible noise-making assemblies. Pulls may further include three or more pull extensions 316 that extend from end of pull 314a through opposing surface 310a and attach with opposing surface 310b such that pull extensions form a cage by which compressible noise-making assemblies may be retained. Pull extensions may include a number of stops 322 positioned to limit movement of opposing surfaces. It may be appreciated that, in embodiments, pulls may include: ropes, straps, strings, yarns, cords, and cables manufactured from polymeric formulations, natural fibers, and metal formulations. Furthermore, pulls may be attached with opposing surfaces in any manner well-known in the art without departing from embodiments disclosed herein.

Figure 4A:
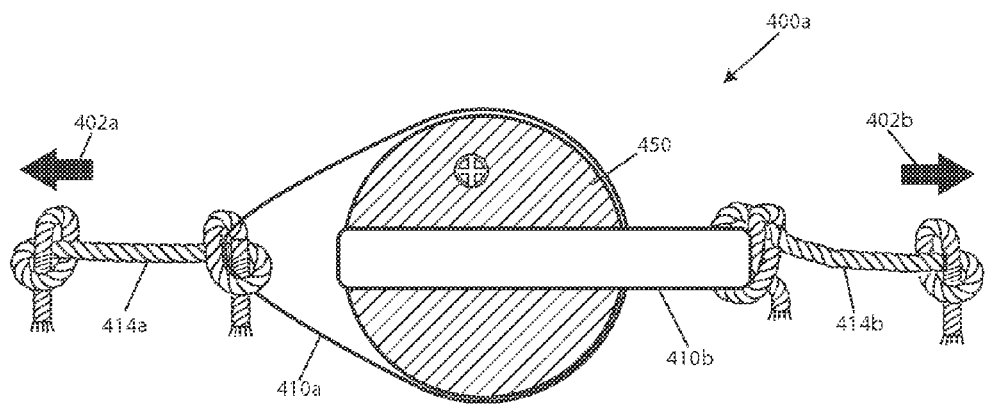
FIGS. 4A to 4C are illustrative representations of alternative noise-making devices in accordance with embodiments of the present invention.
Figure 4B:
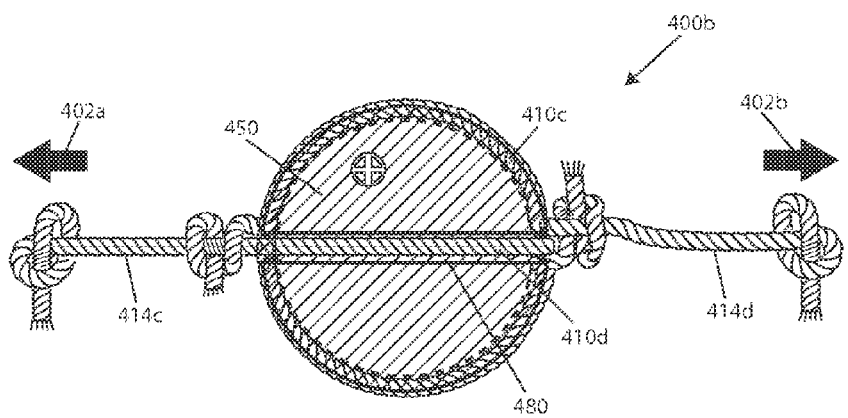
Figure 4C:
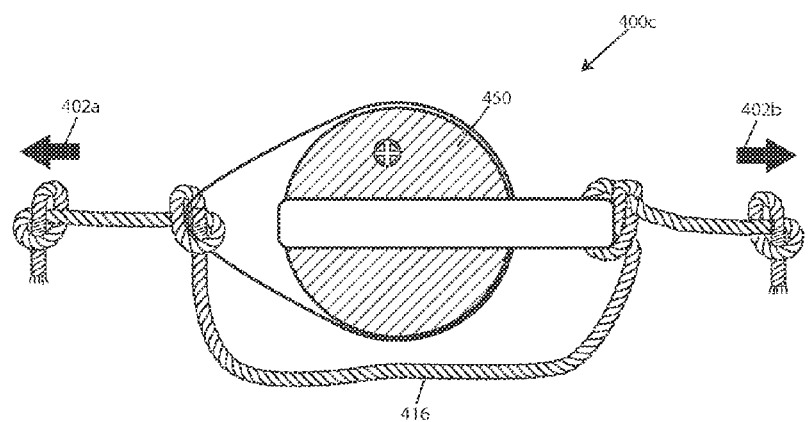

FIGS. 4A to 4C are illustrative representations of another noise-making device in accordance with embodiments of the present invention. In particular, noise making device 400 illustrates an embodiment utilizing indirect motive forces 402a and 402b to apply a compressive force to compressible noise-making assembly 450. As illustrated, compression assembly embodiments include two or more opposing surfaces 410a and 410b, which define a cavity for receiving compressible noise-making assembly 450 such that the opposing surfaces are in mechanical communication with compressible noise-making assembly 450. It may be appreciated that opposing surfaces may include planar surfaces and non-planar surfaces without departing from embodiments of the present invention. In the embodiment illustrated, opposing surfaces 410a and 410b each form an annular surface disposed approximately 90° apart with respect to one another along the compressible noise-making assembly 450. In some embodiments, opposing surfaces may include a non-abrasive pad for further reducing abrasion to compressible noise-making assemblies. In other embodiments, opposing surfaces may include a textured pad for increasing friction to compressible noise-making assemblies. In still other embodiments, opposing surfaces may include an adhesive pad for securing compressible noise-making assemblies by partially bonding with compressible noise-making assembly surface. In addition, opposing surfaces may be manufactured from any number of materials including: semi-flexible polymeric formulations, rigid polymeric formulations, polymeric films, polymeric cloths, and natural fiber cloths without departing from embodiments herein.

Turning briefly to FIG. 4B, in some embodiments, opposing surfaces 410c and 410d may be formed by ropes, straps, strings, yarns, cords, and cables. In some embodiments, compressible noise-making apparatus 460 may further include a groove, channel, or slot 480 formed into its surface for retaining opposing surfaces 410c and 410d. In some embodiments, opposing surfaces may be extensions of pulls 414c and 414d. Returning to FIG. 4A, further illustrated are pulls 414a and 414b. Pulls, as contemplated herein, may be divergently pulled (indirect motive force) such that a compressive force is exerted on compressible noise-making assemblies. It may be appreciated that, in embodiments, pulls may include: ropes, straps, strings, yarns, cords, and cables manufactured from polymeric formulations, natural fibers, and metal formulations. Furthermore, pulls may be attached with opposing surfaces in any manner well-known in the art without departing from embodiments disclosed herein.

Turning to FIG. 4C, pull limiting element 416 is illustrated. Pull limiting elements operate to limit the amount of compressive deformation applied to compressible noise-making assemblies so as to avoid damaging the assemblies. In some embodiments, pull limiting elements may be integral or formed from pulls as shown. In other embodiments, pull limiting elements may be attached with pulls (not shown) and may be manufactured from an elastic material, a semi-elastic material, or a rigid material. It may be appreciated that in like manner, a pull return element may be provided (not shown). In embodiments, pull return elements may be disposed along an outer surface of compressible noise-making assemblies or along an inner surface of compressible noise-making assemblies without limitation. Pull return elements operate by returning compressible noise-making assembly to its original or uncompressed form. In some embodiments, pull return elements may be manufactured from an elastic material or a semi-elastic material. In some embodiments, pull return elements and pull limiting elements may be enabled separately or in combination without limitation.

Figure 5:
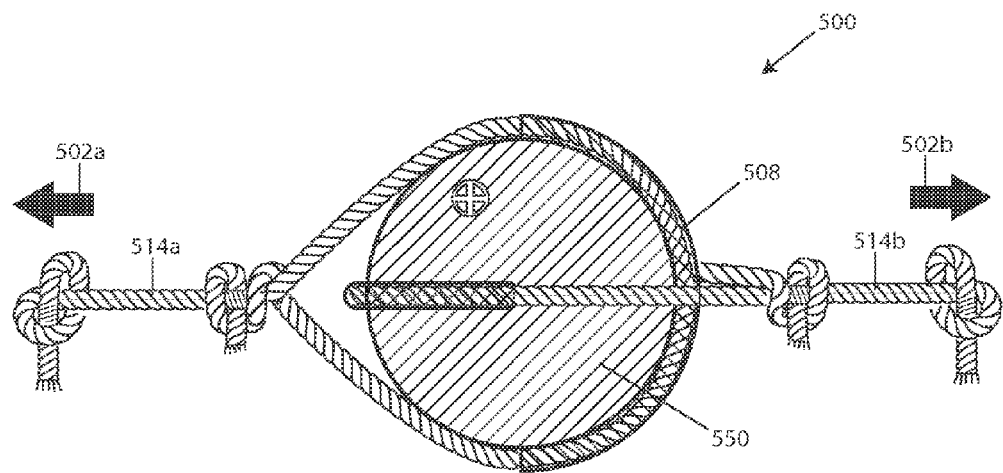
FIG. 5 is an illustrative representation of an alternative noise-making device in accordance with embodiments of the present invention.

FIG. 5 is an illustrative representation of an alternative noise-making device in accordance with embodiments of the present invention. In particular, noise making device 500 illustrates an embodiment utilizing indirect motive forces 502a and 502b to apply a compressive force to compressible noise-making assembly 550. As illustrated, at least two pulls 514a and 514b are in mechanical communication with compressible noise-making assembly 550. Each of the two pulls illustrated may be constructed from a single rope, strap, string, yarn, cord, or cable and secured with compressible noise-making assembly 550 via one or more attachment elements 508 that are generally conformal and affixed with compressible noise-making assembly 550 surface. As illustrated, attachment elements are substantially tubular in shape. However, in other embodiments, attachment elements may be configured differently as illustrated below for FIG. 8.

Figure 6:
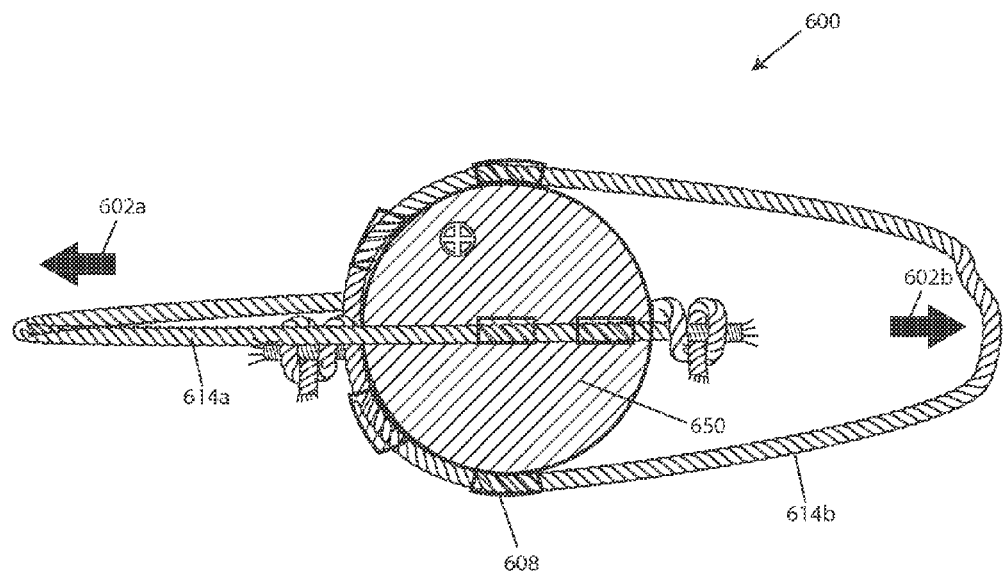
FIG. 6 is an illustrative representation of an alternative noise-making device in accordance with embodiments of the present invention.

FIG. 6 is an illustrative representation of an alternative noise-making device in accordance with embodiments of the present invention. In particular, noise making device 600 illustrates an embodiment utilizing indirect motive forces 602a and 602b to apply a compressive force to compressible noise-making assembly 650. As illustrated, at least two pulls 614a and 614b are in mechanical communication with compressible noise-making assembly 650. Each of the two pulls illustrated may be constructed from a single rope, strap, string, yarn, cord, or cable and secured with compressible noise-making assembly 650 via one or more attachment elements 608 that are generally conformal and affixed with compressible noise-making assembly 650 surface. As illustrated, attachment elements are substantially tubular in shape. However, in other embodiments, attachment elements may be configured differently as illustrated below for FIG. 8.

Figure 7:
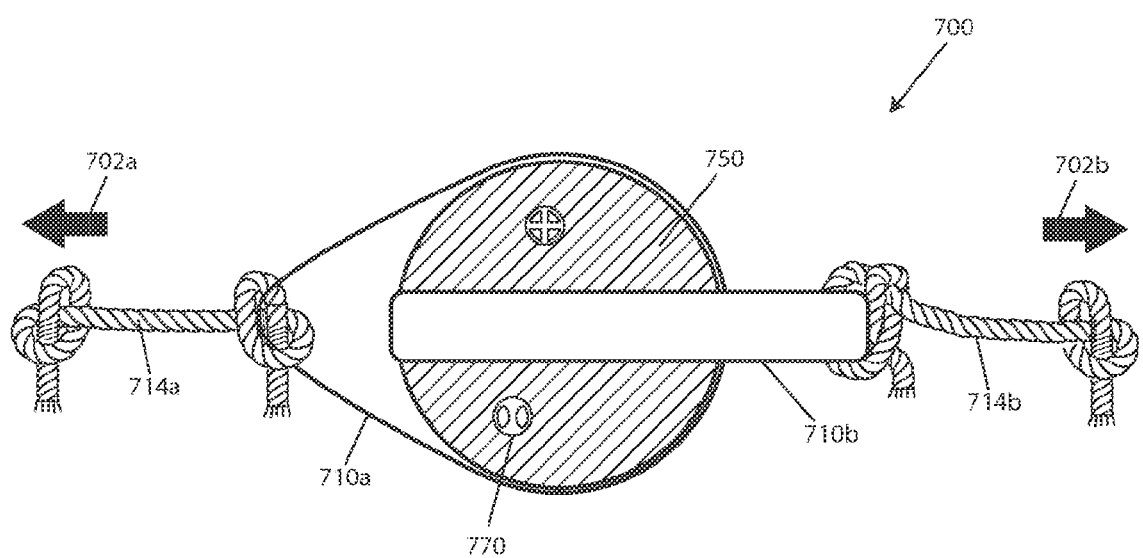
FIG. 7 is an illustrative representation of an alternative noise-making device in accordance with embodiments of the present invention.

FIG. 7 is an illustrative representation of an alternative noise-making device in accordance with embodiments of the present invention. In particular, noise making device 700 illustrates an embodiment utilizing indirect motive forces 702a and 702b to apply a compressive force to compressible noise-making assembly 750. As illustrated, compression assembly embodiments include two or more opposing surfaces 710a and 710b, which define a cavity for receiving compressible noise-making assembly 750 such that the opposing surfaces are in mechanical communication with compressible noise-making assembly 750. Further illustrated are pulls 714a and 714b. Pulls, as contemplated herein, may be divergently pulled (indirect motive force) such that a compressive force is exerted on compressible noise-making assemblies.

In addition, compressible noise-making assembly 750 includes valve structure 770. Valve structures may be enabled as an intake valve or an exhaust valve, the means and methods of constructing each are known to those skilled in the art. In embodiments including valve structure 770, the function of the noise-making device 700 may be modified. For example, when valve structure 770 is an intake valve, the devices passes expelled air content through compressible noise-making assembly 750 upon compression thus causing a noise to be produced. However, in this example, when compression is released, incoming air would mostly pass through valve structure 770, causing little or no sound to be produced. Conversely, a similarly enabled exhaust valve structure would have the opposite function of making noise when compression was released, but not when applied. In addition, valve structures may be constructed integrally or in-line with compressible noise-making assemblies to constrain the amount of air passing through the assembly. Thus, in an embodiment having two compressible noise-making assemblies, one of which included an intake valve structure and one of which included an exhaust valve structure, the assemblies may be configured such that each assembly makes a different noise based upon whether the assemblies are compressed or released. As may be appreciated, any number of valve structures may be utilized in embodiments disclosed herein without departing from the present invention.

Figure 8A:
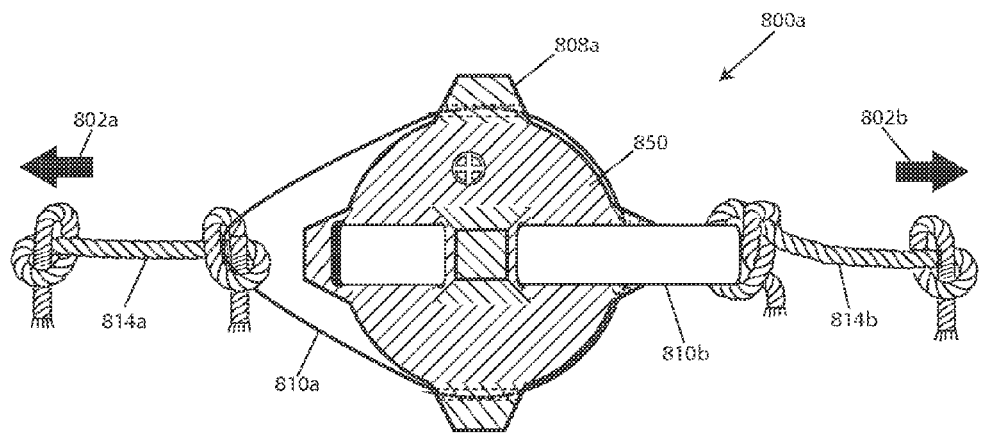
FIGS. 8A and 8B are illustrative representations of alternative noise-making devices in accordance with embodiments of the present invention.

FIG. 8A is an illustrative representations of an alternate noise-making device in accordance with embodiments of the present invention. In particular, noise making device 800a illustrates an embodiment utilizing indirect motive forces 802a and 802b to apply a compressive force to compressible noise-making assembly 850. As illustrated, compression assembly embodiments include two or more opposing surfaces 810a and 810b, which define a cavity for receiving compressible noise-making assembly 850 such that the opposing surfaces are in mechanical communication with compressible noise-making assembly 850. It may be appreciated that opposing surfaces may include planar surfaces and non-planar surfaces without departing from embodiments of the present invention. In the embodiment illustrated, opposing surfaces 810a and 810b each form an annular surface disposed approximately 90° apart with respect to one another along the compressible noise-making assembly 850. In some embodiments, opposing surfaces may include a non-abrasive pad for further reducing abrasion to compressible noise-making assemblies. In other embodiments, opposing surfaces may include a textured pad for increasing friction to compressible noise-making assemblies. In still other embodiments, opposing surfaces may include an adhesive pad for securing compressible noise-making assemblies by partially bonding with compressible noise-making assembly surface. In addition, opposing surfaces may be manufactured from any number of materials including: semi-flexible polymeric formulations, rigid polymeric formulations, polymeric films, polymeric cloths, and natural fiber cloths without departing from embodiments herein.

Further illustrated are pulls 814a and 814b. Pulls, as contemplated herein, may be divergently pulled (indirect motive force) such that a compressive force is exerted on compressible noise-making assemblies. It may be appreciated that, in embodiments, pulls may include: ropes, straps, strings, yarns, cords, and cables manufactured from polymeric formulations, natural fibers, and metal formulations. Furthermore, pulls may be attached with opposing surfaces in any manner well-known in the art without departing from embodiments disclosed herein. Still further illustrated are a number of attachment elements 808a. In the illustrated embodiment, six attachment elements each one having a guide slot for receiving opposing surfaces. In this manner two opposing surfaces may be utilized for pulls in two directions.

Figure 8B:
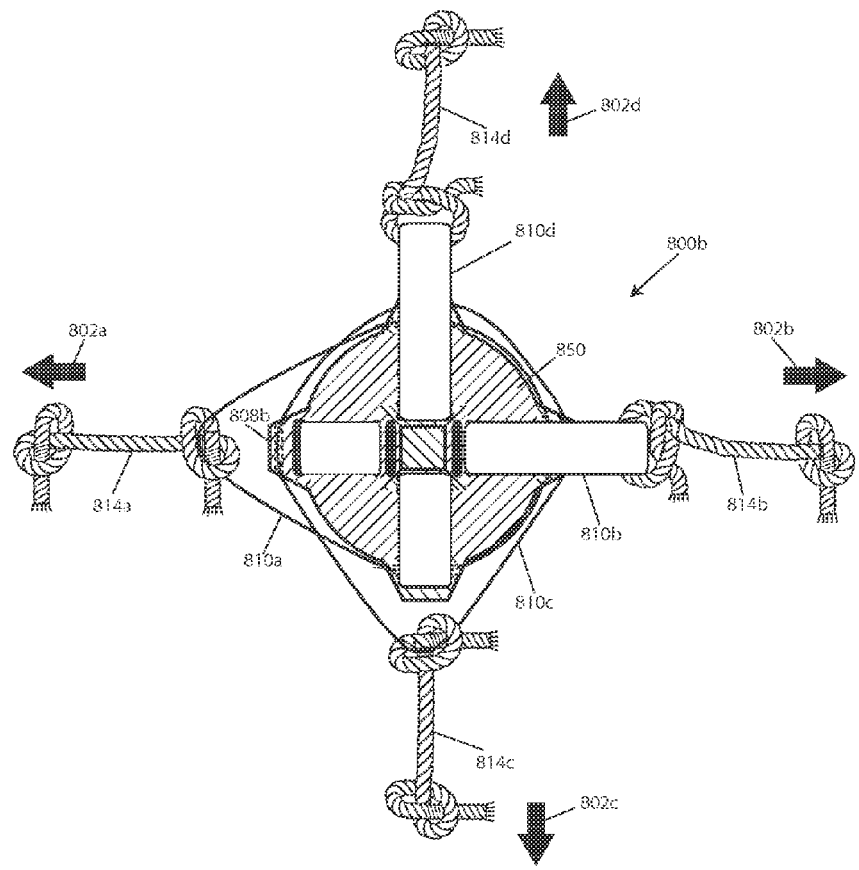

FIG. 8B is an illustrative representations of an alternate noise-making device in accordance with embodiments of the present invention. In particular, noise making device 800b illustrates an embodiment utilizing indirect motive forces 802a, 802b, 802c, and 802d to apply a compressive force to compressible noise-making assembly 850. As illustrated, compression assembly embodiments include four or more opposing surfaces 810a, 810b, 810c, and 810d, which define a cavity for receiving compressible noise-making assembly 850 such that the opposing surfaces are in mechanical communication with compressible noise-making assembly 850. It may be appreciated that opposing surfaces may include planar surfaces and non-planar surfaces without departing from embodiments of the present invention. In the embodiment illustrated, opposing surfaces 810a and 810b each form an annular surface disposed approximately 90° apart with respect to one another along the compressible noise-making assembly 850. Furthermore, opposing surfaces 810c and 810d each form an annular surface disposed approximately 90° apart with respect to one another along the compressible noise-making assembly 850. In some embodiments, opposing surfaces may include a non-abrasive pad for further reducing abrasion to compressible noise-making assemblies. In other embodiments, opposing surfaces may include a textured pad for increasing friction to compressible noise-making assemblies. In still other embodiments, opposing surfaces may include an adhesive pad for securing compressible noise-making assemblies by partially bonding with compressible noise-making assembly surface. In addition, opposing surfaces may be manufactured from any number of materials including: semi-flexible polymeric formulations, rigid polymeric formulations, polymeric films, polymeric cloths, and natural fiber cloths without departing from embodiments herein.

Further illustrated are pulls 814a, 814b, 814c, and 814d. Pulls, as contemplated herein, may be divergently pulled (indirect motive force) such that a compressive force is exerted on compressible noise-making assemblies. It may be appreciated that, in embodiments, pulls may include: ropes, straps, strings, yarns, cords, and cables manufactured from polymeric formulations, natural fibers, and metal formulations. Furthermore, pulls may be attached with opposing surfaces in any manner well-known in the art without departing from embodiments disclosed herein. Still further illustrated are a number of attachment elements 808a. In the illustrated embodiment, six attachment elements each element having two guide slots for receiving opposing surfaces. In this manner four opposing surfaces may be utilized for pulls in four directions.

Figure 9:
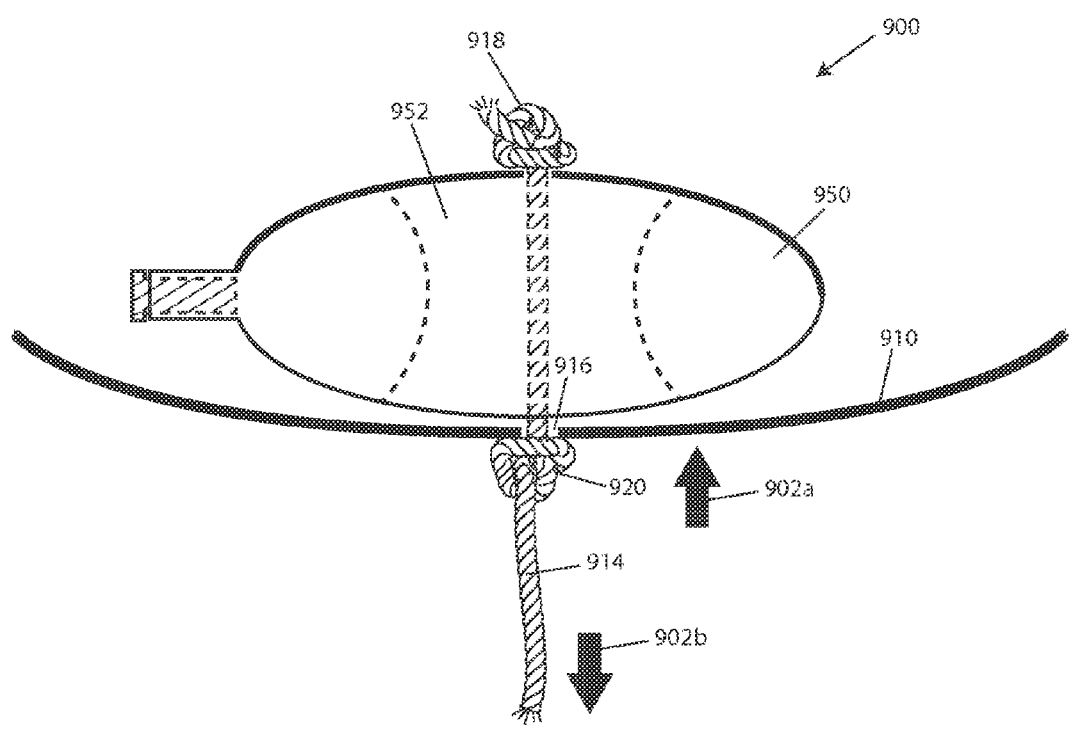
FIG. 9 is an illustrative representation of noise-making device having a through-hole in accordance with embodiments of the present invention.

FIG. 9 is an illustrative representation of noise-making device 900 having a through-hole in accordance with embodiments of the present invention. In particular, noise making device 900 illustrates an embodiment utilizing indirect motive forces 902a and 902b to apply a compressive force to compressible noise-making assembly 950. As illustrated, compressible noise-making assembly 950 includes through-hole 952. Through-holes provide a convenient capturing structure for various embodiments disclosed herein. Further illustrated, compression surface 910 includes surface hole 916, which may align with through-hole 952. In embodiments, compression surfaces may include: a planar surface, a semi-planar surface, a convex surface, a concave surface, and an annular surface without limitation. Further illustrated is pull 914 which extends through surface hole 916 and through-hole 952. Pull 914 further includes compression stop 918.

In operation, pull 914 may be tugged or pulled whereupon compressible noise-making assembly 950 is compressed between compression stop 918 and compression surface 910 to make a noise. Upon release, compressible noise-making assembly 950 returns to its original form. In some embodiments, pull 914 may include retention stop 920, which may further limit movement of compressible noise-making assembly 950. As above, in embodiments, pulls may include: ropes, straps, strings, yarns, cords, and cables manufactured from polymeric formulations, natural fibers, and metal formulations.

Figure 10:
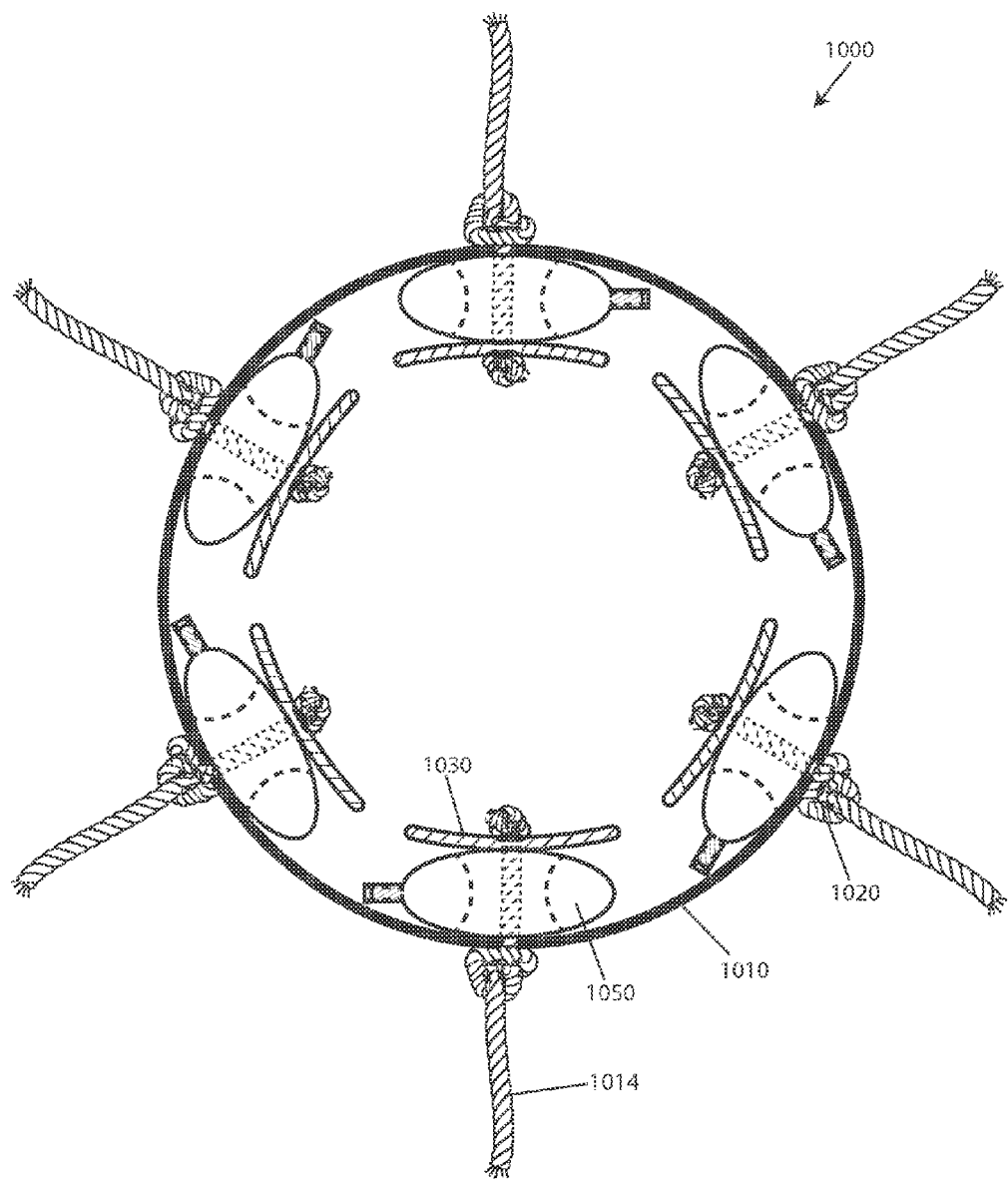
FIG. 10 is an illustrative representation of an alternate noise-making device having a through-hole in accordance with embodiments of the present invention.

FIG. 10 is an illustrative representation of an alternate noise-making device 1000 having a through-hole in accordance with embodiments of the present invention. In particular, noise making device 1000 illustrates an embodiment utilizing several embodiments of type described in FIG. 9 above. In addition to elements described above, compression assemblies may further include additional compression surface 1030 disposed along inward surface of compressible noise-making assembly 1050. Additional compression surfaces may provide additional compression area so that greater compression may be exerted upon compressible noise-making assembly 1050. Additional compression surfaces may include: a planar surface, a semi-planar surface, a convex surface, a concave surface, and an annular surface without limitation.

In operation, pull 1014 may be tugged or pulled whereupon compressible noise-making assembly 1050 is compressed between compression stop 1018 and compression surface 1010 to make a noise. In this embodiment, compression surface is a spherical surface, but may also be a non-spherical surface in other embodiments. Upon release, compressible noise-making assembly 1050 returns to its original form. In some embodiments, pull 1014 may include retention stop 1020, which may further limit movement of compressible noise-making assembly 1050. As above, in embodiments, pulls may include: ropes, straps, strings, yarns, cords, and cables manufactured from polymeric formulations, natural fibers, and metal formulations. It may be appreciated that many different shapes may be utilized when utilizing embodiments disclosed herein due at least in part to the ability to utilized indirect motive forces on toys or training tools.

Expanding Deformation

Figure 11:
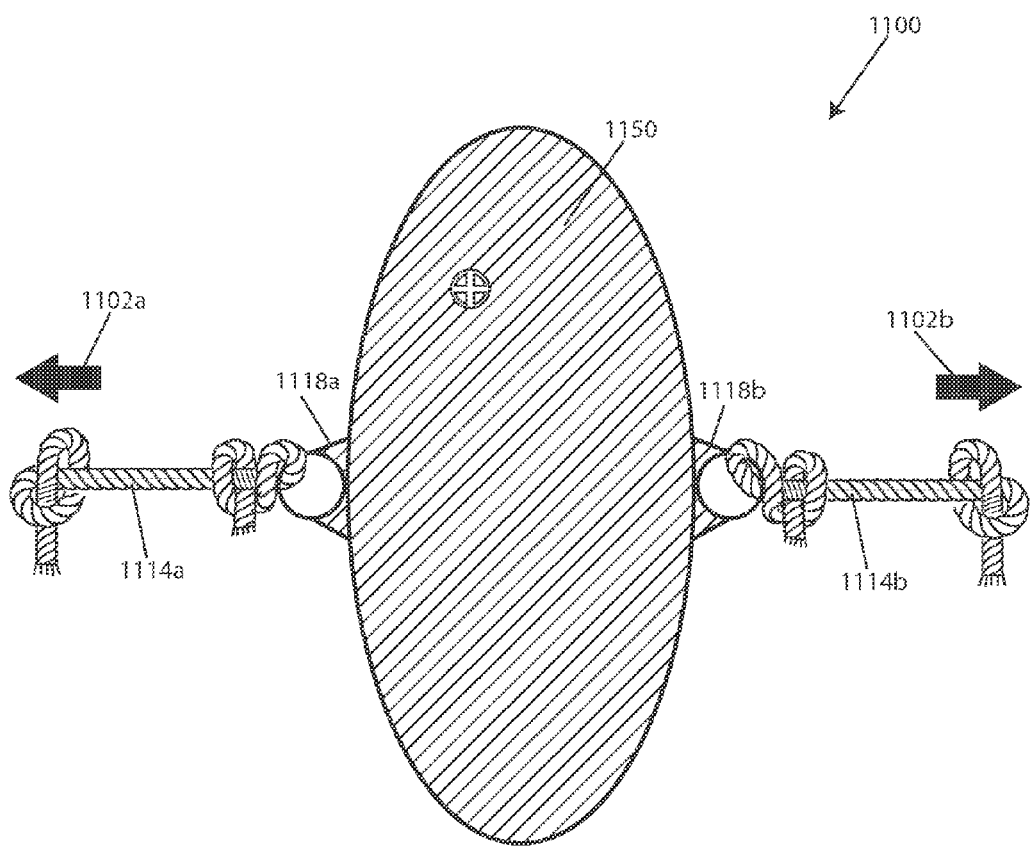
FIG. 11 is an illustrative representation of a noise-making device utilizing expanding deformation in accordance with embodiments of the present invention.

The following figures and embodiments may be categorized as noise-making devices that operate generally by expanding deformation. That is, in operation, an expandable noise-making assembly may emit a noise when the assembly is expanded. In some embodiments, a noise may be emitted when air is drawn into the assembly. In other embodiments, noise may be emitted when air is expelled from the assembly once expanding forces are released. In still other embodiments, a noise may be emitted when air is both drawn into and expelled from the assembly. FIG. 11 is an illustrative representation of a noise-making device 1100 utilizing expanding deformation in accordance with embodiments of the present invention. In particular, noise making device 1100 illustrates an embodiment utilizing indirect motive forces 1102a and 1102b to apply an expanding force to expandable noise-making assembly 1150. As illustrated, expandable noise-making assembly 1150 may include two or more pull tabs 1118a and 1118b juxtaposed across surface of expandable noise-making assembly 1150. In some embodiments, through-holes may be juxtaposed across surface of expandable noise-making assemblies for attaching pulls. Indeed, any manner of connection may be utilized for expandable noise-making assemblies without departing from embodiments disclosed herein.

Further illustrated are pulls 1114a and 1114b. Pulls, as contemplated herein, may be divergently pulled (indirect motive force) such that an expanding force is exerted on expandable noise-making assemblies. It may be appreciated that, in embodiments, pulls may include: ropes, straps, strings, yarns, cords, and cables manufactured from polymeric formulations, natural fibers, and metal formulations. It may be further appreciated that the positioning, assemblage, and type of the components in this figure and all other figures and discussions herein are for illustration only and that numerous alternative methods of construction and assembly will be readily apparent to those skilled in the arts.

Figure 12A:
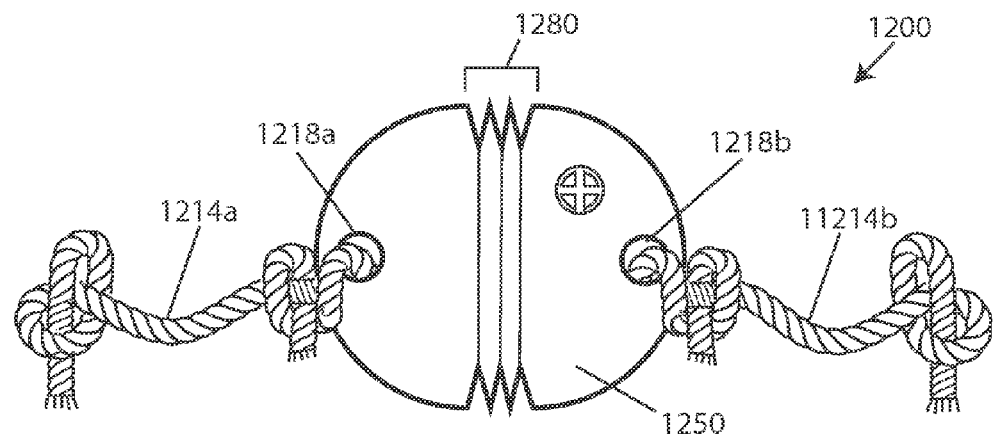
FIGS. 12A and 12B are illustrative representations of an alternate noise-making device utilizing expanding deformation in operation in accordance with embodiments of the present invention.
Figure 12B:
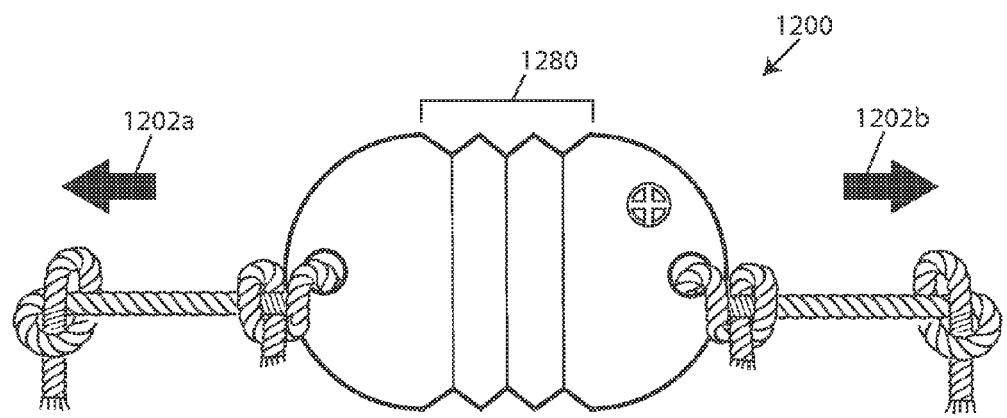

FIGS. 12A and 12B are an illustrative representation of an alternate noise-making device 1200 in operation utilizing expanding deformation in accordance with embodiments of the present invention. In particular, noise making device 1200 illustrates an embodiment utilizing indirect motive forces 1202a and 1202b to apply an expanding force to expandable noise-making assembly 1250. As illustrated expandable noise-making assembly 1250 may include two or more through-holes 1218a and 1218b juxtaposed across surface of expandable noise-making assembly 1250. As noted above, any manner of connection may be utilized for expandable noise-making assemblies without departing from embodiments disclosed herein. Further illustrated are pulls 1214a and 1214b. Pulls, as contemplated herein, may be divergently pulled (indirect motive force) such that an expanding force is exerted on expandable noise-making assemblies. It may be appreciated that, in embodiments, pulls may include: ropes, straps, strings, yarns, cords, and cables manufactured from polymeric formulations, natural fibers, and metal formulations. In some embodiments, pull limiting elements (not shown) may operate to limit the amount of expanding deformation applied to expandable noise-making assemblies so as to avoid damaging the assemblies. In some embodiments, pull limiting elements may be integral or formed from pulls. In other embodiments, pull limiting elements may be attached with pulls and may be manufactured from an elastic material, a semi-elastic material, or a rigid material. It may be appreciated that in like manner, a pull return element may be provided (not shown). In embodiments, pull return elements may be disposed along an outer surface of expandable noise-making assemblies or along an inner surface of expandable noise-making assemblies without limitation. Pull return elements operate by returning expandable noise-making assembly to its original or unexpanded form. In some embodiments, pull return elements may be manufactured from an elastic material or a semi-elastic material. In some embodiments, pull return elements and pull limiting elements may be enabled separately or in combination without limitation.

As illustrated, expandable noise-making assembly 1250 further includes expanding portion 1280 disposed along its surface which is not expanded in FIG. 12A and which is expanded in FIG. 12B. Expansion portion may be configured as one or more expansion pleats, one or more expansion folds, a limited stretch material, and a semi-flexible material in embodiments disclosed herein without limitation. It may be further appreciated that the positioning, assemblage, and type of the components in this figure and all other figures and discussions herein are for illustration only and that numerous alternative methods of construction and assembly will be readily apparent to those skilled in the arts.

Alternate Embodiments

Figure 13:
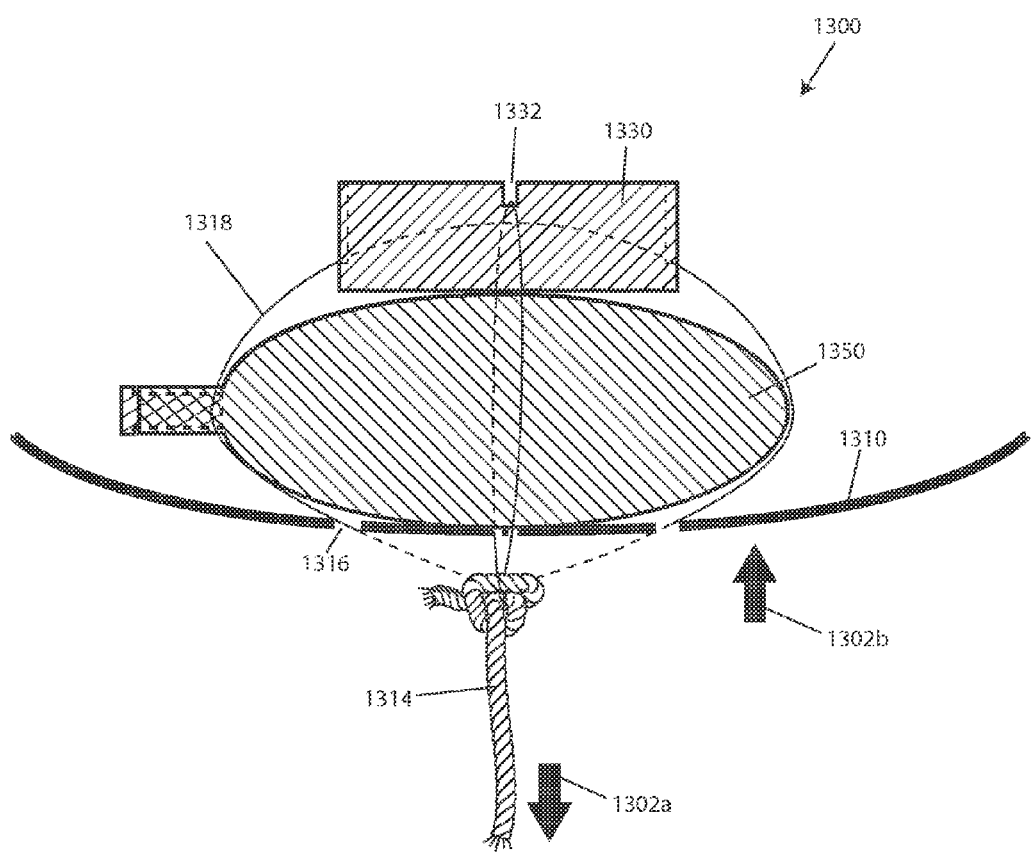
FIG. 13 is an illustrative representation of an alternative noise-making device in accordance with embodiments of the present invention.

FIG. 13 is an illustrative representation of an alternative noise-making device 1300 in accordance with embodiments of the present invention. In particular, noise making device 1300 illustrates an embodiment utilizing indirect motive forces 1302a and 1302b to apply a compressive force to compressible noise-making assembly 1350. As illustrated, compression surface 1310 includes surface holes 1316 for receiving pull extension 1318. In embodiments, compression surfaces may include: a planar surface, a semi-planar surface, a convex surface, a concave surface, and an annular surface without limitation. In addition, compression assemblies may further include compression element 1330 disposed along inward surface of compressible noise-making assembly 1350 that includes slot 1332 disposed along top surface of compression element to provide a guide or an affixing point for pull extension 1318. Compression elements may include blocks, washers, and stops in embodiments without limitation.

Figure 14:
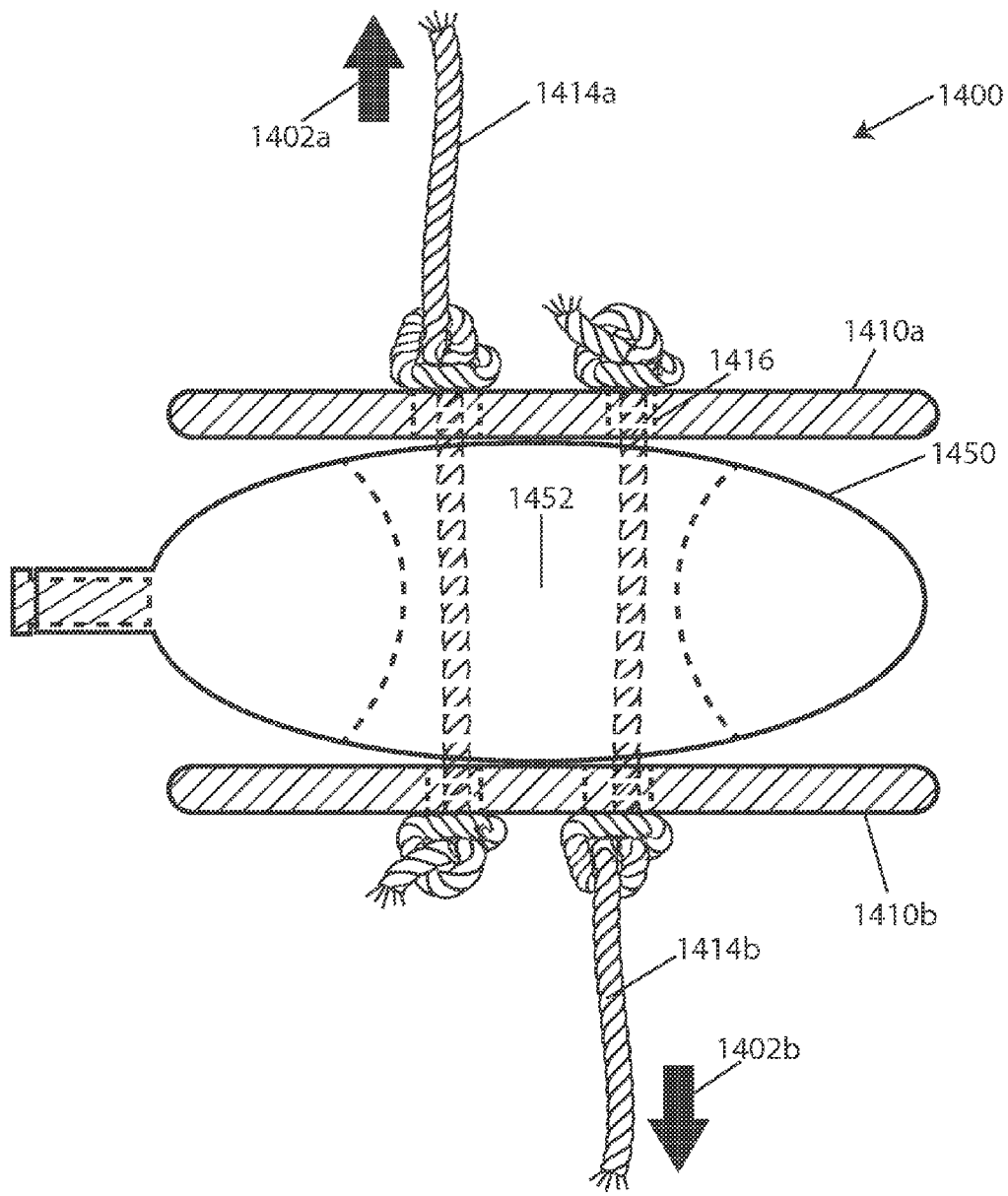
FIG. 14 is an illustrative representation of noise-making device having a through-hole in accordance with embodiments of the present invention.

FIG. 14 is an illustrative representation of noise-making device 1400 having a through-hole in accordance with embodiments of the present invention. In particular, noise making device 1400 illustrates an embodiment utilizing indirect motive forces 1402a and 1402b to apply a compressive force to compressible noise-making assembly 1450. As illustrated, compressible noise-making assembly 1450 includes through-hole 1452. Through-holes may provide a convenient capturing structure for various embodiments disclosed herein. Further illustrated, compression surface 1410a includes surface hole 1416, which may align with through-hole 1452. In embodiments, compression surfaces may include: a planar surface, a semi-planar surface, a convex surface, a concave surface, and an annular surface without limitation. Further illustrated are pulls 1414a and 1414b which extend via through-hole 1452 and surface hole 1416. In operation, pulls 1414a and 1414b may be tugged or pulled whereupon compressible noise-making assembly 1450 may be compressed between compression surfaces 1410a and 1410b to make a noise. Upon release, compressible noise-making assembly 1450 returns to its original form. As above, in embodiments, pulls may include: ropes, straps, strings, yarns, cords, and cables manufactured from polymeric formulations, natural fibers, and metal formulations.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A noise-making device comprising:
   a compressible noise-making assembly, the compressible noise-making assembly configured for emitting a noise upon compressive deformation;
   a compression assembly for compressing and retaining the compressible noise-making assembly, the compression assembly comprising,
      at least two opposing surfaces defining a cavity for receiving the compressible noise-making assembly, the at least two opposing surfaces each in mechanical communication with the compressible noise-making assembly, wherein each of the at least two opposing surfaces form an annular surface, wherein the at least two opposing surfaces are disposed approximately 90° apart with respect to one another along the compressible noise-making assembly, and wherein the at least two opposing surfaces are at least partially bonded with a surface of the compressible noise-making assembly, and
      at least two pulls each attached to one of the at least two opposing surfaces such that when the at least two pulls are divergently pulled a compressive force is exerted upon the compressible noise-making device by the at least two opposing surfaces.

2. The device of claim 1, wherein the compression assembly further comprises a pull limiting element attached along each of the at least two pulls such that the compressive deformation of the compressible noise-making assembly is limited.

3. The device of claim 1, wherein the compression assembly further comprises a pull return element attached along each of the at least two pulls such that the compressible noise-making assembly is decompressed.

4. The device of claim 1 wherein the compressible noise-making assembly further includes a groove formed along a surface of the compressible noise-making assembly for retaining the at least opposing surfaces.

5. The device of claim 1 wherein the compressible noise-making assembly further includes at least two attachment elements disposed along a surface of the compressible noise-making assembly, wherein the at least two attachment elements include at least one slot for receiving the opposing surface.

6. The device of claim 1, wherein each of the at least two pulls further comprise:
   at least three pull extensions, wherein
      the at least three pull extensions extend from an end of the pull, wherein
      the at least three pull extensions extend through a nearer of the at least two opposing surfaces, wherein
      the at least three pull extensions attach with the farther of the at east two opposing surfaces, and wherein
      the at least three pull extensions form a cage by which the compressible noise-making assembly is retained.

7. The device of claim 6, wherein the at least three pull extensions further include a stop positioned to limit movement of the nearer of the at least two opposing surfaces.

8. The device of claim 1, wherein
   each of the at least two opposing surfaces further comprise at least two pull tabs disposed along an outer edge of each of the at least two opposing surfaces, wherein the at least two pull tabs extend approximately perpendicular from the opposing surface, and wherein
the at least two pull tabs form a cage by which the compressible noise-making assembly is retained, wherein
each of the at least two pulls further comprise at least two pull extensions, wherein
the at least two pull extensions extend from an end of the pull, and wherein
the at least two pull extensions each attach with each of the at least two pull tabs.

9. A noise-making device comprising:
a compressible noise-making assembly, the compressible noise-making assembly configured for emitting a noise upon compressive deformation;
a compression assembly for compressing and retaining the compressible noise-making assembly, the compression assembly comprising,
at least two opposing surfaces defining a cavity for receiving the compressible noise-making assembly, the at least two opposing surfaces each in mechanical communication with the compressible noise-making assembly, and
at least two pulls each attached to one of the at least two opposing surfaces such that when the at least two pulls are divergently pulled a compressive force is exerted upon the compressible noise-making device by the at least two opposing surfaces, and
a pull limiting element attached along each of the at least two pulls such that the compressive deformation of the compressible noise-making assembly is limited.

10. The device of claim 9 wherein the compressible noise-making assembly further includes a groove formed along a surface of the compressible noise-making assembly for retaining the at least opposing surfaces.

11. The device of claim 9 wherein the compressible noise-making assembly further includes at least two attachment elements disposed along a surface of the compressible noise-making assembly, wherein the at least two attachment elements include at least one slot for receiving the opposing surface.

12. The device of claim 9, wherein
each of the at least two opposing surfaces further comprise
at least two pull tabs disposed along an outer edge of each of the at least two opposing surfaces, wherein
the at least two pull tabs extend approximately perpendicular from the opposing surface, and wherein
the at least two pull tabs form a cage by which the compressible noise-making assembly is retained, wherein
each of the at least two pulls further comprise at least two pull extensions, wherein
the at least two pull extensions extend from an end of the pull, and wherein
the at least two pull extensions each attach with each of the at least two pull tabs.

13. A noise-making device comprising:
a compressible noise-making assembly, the compressible noise-making assembly configured for emitting a noise upon compressive deformation;
a compression assembly for compressing and retaining the compressible noise-making assembly, the compression assembly comprising,
at least two opposing surfaces defining a cavity for receiving the compressible noise-making assembly, the at least two opposing surfaces each in mechanical communication with the compressible noise-making assembly, and
at least two pulls each attached to one of the at least two opposing surfaces such that when the at least two pulls are divergently pulled a compressive force is exerted upon the compressible noise-making device by the at least two opposing surfaces, and
a pull return element attached along each of the at least two pulls such that the compressible noise-making assembly is decompressed.

14. The device of claim 13 wherein the compressible noise-making assembly further includes a groove formed along a surface of the compressible noise-making assembly for retaining the at least opposing surfaces.

15. The device of claim 13 wherein the compressible noise-making assembly further includes at least two attachment elements disposed along a surface of the compressible noise-making assembly, wherein the at least two attachment elements include at least one slot for receiving the opposing surface.

16. The device of claim 13, wherein
each of the at least two opposing surfaces further comprise
at least two pull tabs disposed along an outer edge of each of the at least two opposing surfaces, wherein
the at least two pull tabs extend approximately perpendicular from the opposing surface, and wherein
the at least two pull tabs form a cage by which the compressible noise-making assembly is retained, wherein
each of the at least two pulls further comprise at least two pull extensions, wherein
the at least two pull extensions extend from an end of the pull, and wherein
the at least two pull extensions each attach with each of the at least two pull tabs.

* * * * *